(12) United States Patent
Delpier et al.

(10) Patent No.: US 9,310,839 B2
(45) Date of Patent: Apr. 12, 2016

(54) DISABLE HOME KEY

(71) Applicant: Hewlett-Packard Development Company, L.P., Houston, TX (US)

(72) Inventors: Michael Delpier, Houston, TX (US); Kevin L. Massaro, Houston, TX (US); Stacy L. Wolff, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 479 days.

(21) Appl. No.: 13/751,751

(22) Filed: Jan. 28, 2013

(65) Prior Publication Data

US 2014/0211408 A1 Jul. 31, 2014

(51) Int. Cl.
 *G06F 1/16* (2006.01)
(52) U.S. Cl.
 CPC ............... *G06F 1/1632* (2013.01); *G06F 1/16* (2013.01)
(58) Field of Classification Search
 CPC ............................... G06F 1/16; G06F 1/1632
 USPC ............................... 361/679.43, 169
 See application file for complete search history.

(56) References Cited

U.S. PATENT DOCUMENTS

| | | | |
|---|---|---|---|
| 5,987,545 A * | 11/1999 | Oh ..................... | G06F 13/4081 710/100 |
| 7,884,299 B2 * | 2/2011 | Glew ........................... | 200/600 |
| 2003/0222149 A1 * | 12/2003 | Solomon et al. ......... | 235/472.01 |
| 2010/0253629 A1 * | 10/2010 | Orsley ............................ | 345/168 |
| 2011/0289427 A1 * | 11/2011 | Toprani ......................... | 715/746 |
| 2012/0131230 A1 * | 5/2012 | Ady et al. ........................ | 710/8 |
| 2013/0162515 A1 * | 6/2013 | Prociw ................... | G06F 1/1632 345/156 |

FOREIGN PATENT DOCUMENTS

CN 202275360 U * 6/2012
EP 2607982 A1 * 6/2013

OTHER PUBLICATIONS

"Tablet Keyboard Review: Samsung Galaxy Tab 10.1 Full Size Keyboard Dock Review"; < http://www.mobiletechreview.com/ubbthreads/showflat.php?Number=40961 >, Jul. 11, 2011.

* cited by examiner

*Primary Examiner* — Dion R Ferguson
*Assistant Examiner* — Mandeep S Buttar
(74) *Attorney, Agent, or Firm* — HP Patent Department

(57) ABSTRACT

A docking station can be coupled to a tablet computing device. A tablet computing device can include a home key that is disabled when the tablet is connected to the docking station. The docking station can include a release to separate the tablet computing device from the docking station.

16 Claims, 4 Drawing Sheets

DISABLE HOME KEY

BACKGROUND

A tablet computer is a personal computer, operated by touchscreen, the user's finger may function as the mouse and cursor, removing the need for a separate mouse. An onscreen, virtual keyboard may be displayed on the display. Convertible notebook computers have an integrated keyboard that can be hidden by a swivel joint or slide joint, exposing only the screen for touch operation. Hybrid computers have a detachable keyboard so that the touch screen can be used as a stand-alone tablet.

BRIEF DESCRIPTION OF THE DRAWINGS

Some implementations of the invention are described with respect to the following figures.

DETAILED DESCRIPTION

A hybrid notebook computer includes two parts, a tablet and docking station. Fasteners can hold the tablet to the docking station. The fasteners may be hooks for example that are engaged with detents in the tablet when the tablet is attached to the docking station. To detach the tablet from the docking station the fasteners have to be released from the detents in the tablet. The release may be for example a button or a slide switch.

A tablet may include a home button. The home button can be used to bring up the home screen or main menu. The home button may be in close proximity to the release and inadvertently activated when the user is trying to release the fasteners to decouple the tablet from the docking station.

In one example implementation, a computing system includes a tablet computing device and a docking station to couple to the tablet computing device. A home key is in the tablet computing device. A release is in the docking station, the release is to separate the tablet computing device from the docking station. A controller is in the tablet computing device to disable the home key if the tablet computing device is connected to the docking station.

In one example implementation, a computing device includes a tablet computing device and a docking station to couple to the tablet computing device. A home key is in the tablet computing device. A release is in the docking station to separate the tablet computing device from the docking station. A controller in the tablet computing device is to disable the home key if the tablet computing device is connected to the docking station and the release is activated.

In one example implementation, a method of disabling a home key includes detecting that a tablet computing device comprising the home key is attached to a docking station. The tablet computing system can be prevented from displaying the home screen when the home key is activated and the tablet computing device is attached to the docking station.

Figure 1:
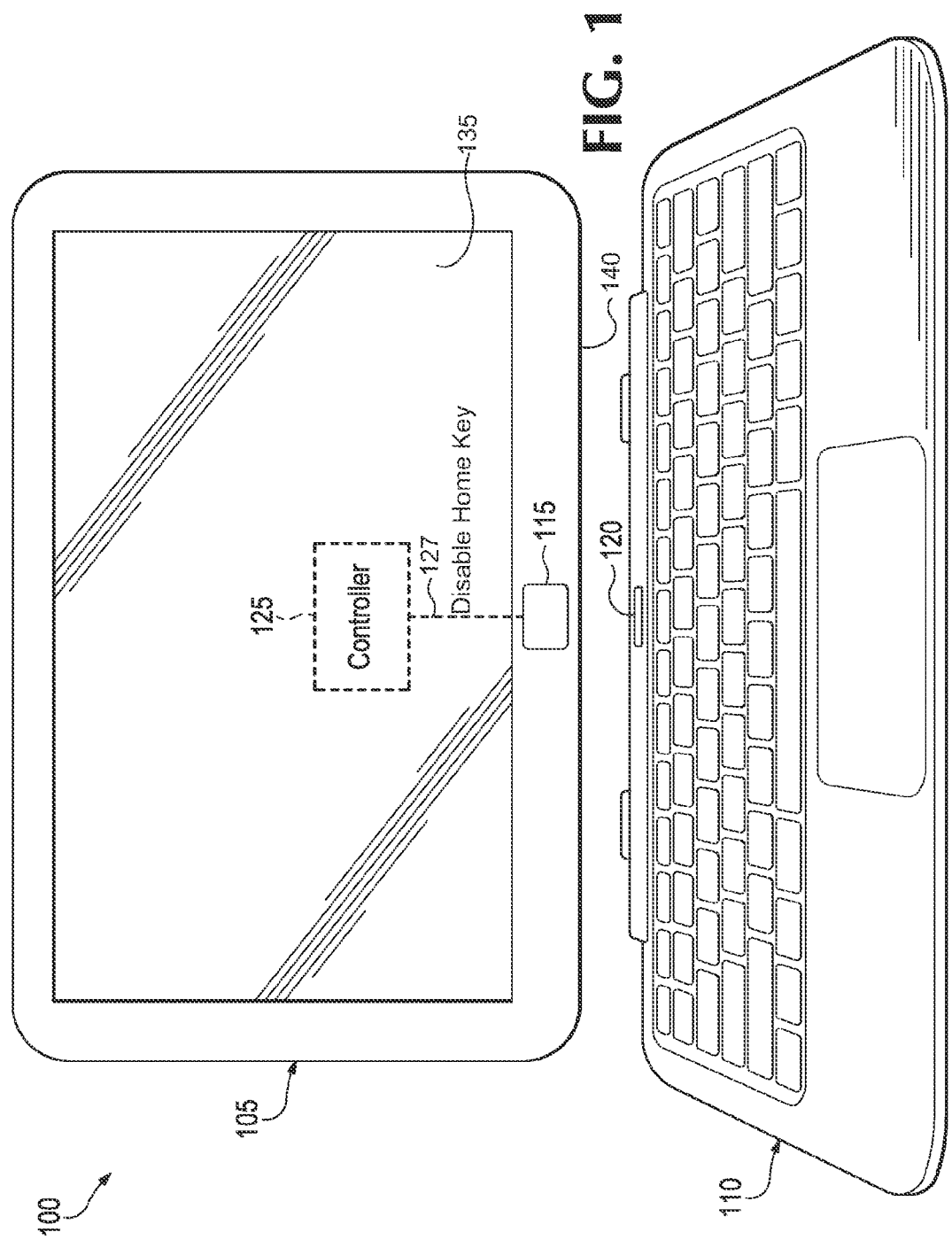
FIG. 1 is a tablet computing device and a docking station according to an example implementation.

With reference to the figures, FIG. 1 is a tablet computing device 105 and a docking station 110 according to an example implementation. A computing system 100 includes the tablet computing device 105 and the docking station 110. The docking station 110 can be coupled to the tablet computing device 105. The tablet 105 can include a home key 115. The home key 115 may be for example located on the bottom portion of the tablet computing device 105 between the display 135 of the tablet computing device and the edge 140 of the tablet computing device. The home key 115 may also be an icon on the display 135 of the tablet computing device 105.

A docking station can include a release 120 to separate the tablet computing device 105 from the docking station 110. The release may be for example a button, a slide switch or another type of release. In one embodiment the release may be on the tablet rather than the docking station. While the docking station is shown with a keyboard the docking station may have a feature other than the keyboard and may not include a keyboard. For example the docking station may have a point of sale feature for scanning credit cards and not include a physical keyboard.

The home key 115 and the release may be aligned perpendicular to the edge 140 of the tablet. Aligning the home key 115 and the release can provide a user a visual indication of how to align the tablet computing device 105 to the docking station 110 when the tablet computing device 105 is being docked to the docking station 110.

The tablet computing device 105 can include a controller 125 in the tablet computing device 105 to disable the home key 115 if the tablet computing device 105 is connected to the docking station 110. The controller 125 is internal to the tablet device and is therefore shown in dotted lines. The controller 125 may be for example a general purpose processor. Disabling the home key 115 can mean that the home key 115 does not perform a function associated with the home key when the home key is activated. The controller 125 can generate a signal 127 that causes the home key not to perform the function associated with the home key. The signal may be to an input output hub connected to the home key 115 to detect the activation of the home key 115. In addition to disabling the home key the signal may be used to cause an indication that home key 115 is disabled.

Figure 2:
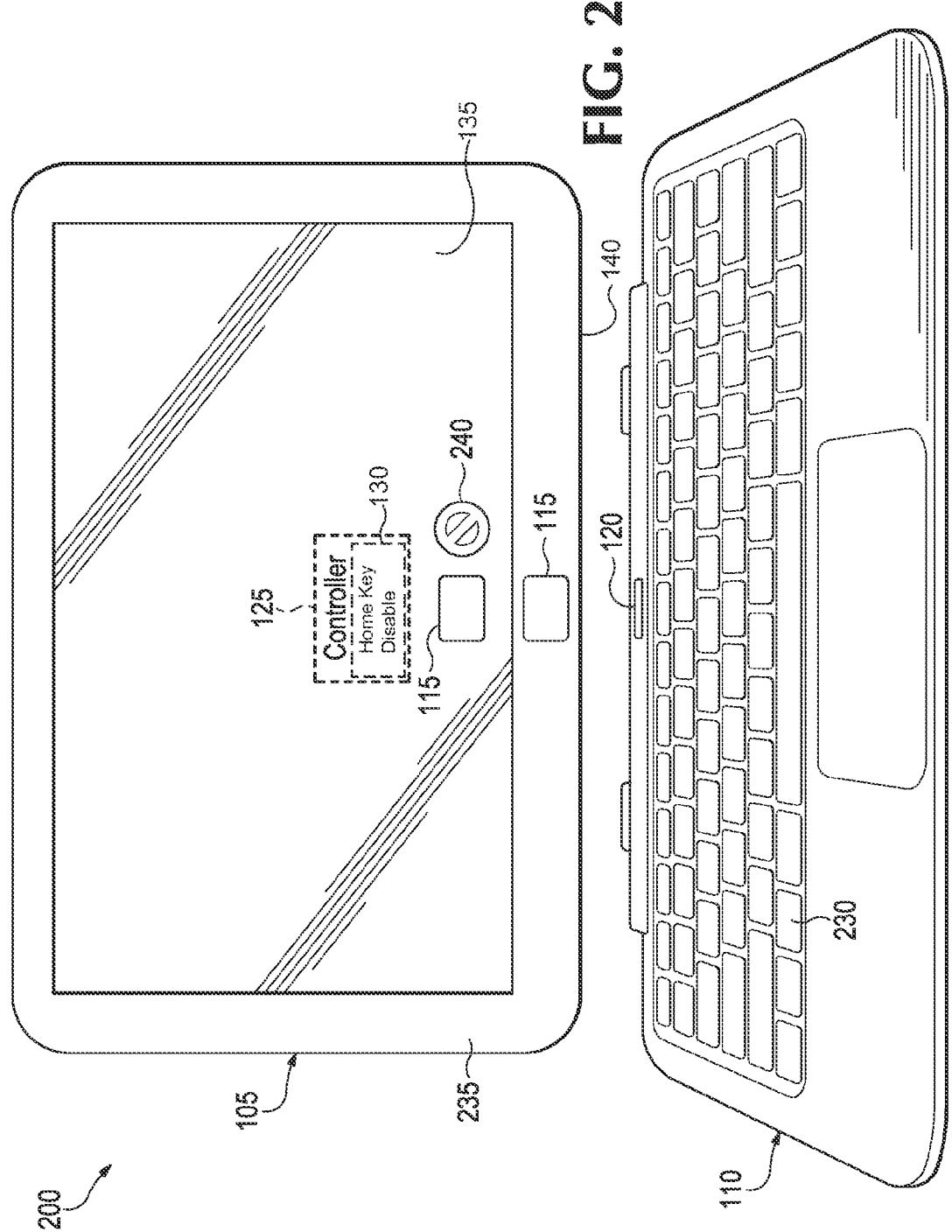
FIG. 2 is a tablet computing device and a docking station according to an example implementation.

FIG. 2 is a tablet computing device 105 and a docking station 110 according to an example implementation. The tablet computing device 105 can include a home key 115. The home key 115 may be for example a capacitance switch. A capacitance switch has no moving parts and detects activation of the switch by a change in the capacitance. The home key 115 therefore may be activated by swiping across or close to the home key and changing the capacitance of the switch. When the home key 115 is close to the release 120, activating the release may cause the capacitance to change as the users finger that is activating the release may change the capacitance at the home key 115. The home key 115 may be disabled when the home key 115 and the release are within a threshold distance. The threshold distance may be for example 3 centimeters. Sensors may determine how close the tablet is to the docking station and based on the proximity of the docking station to the tablet the distance between the home key and the release can be determined and compared to the threshold distance.

The home key may be in the bezel 235 of the tablet computing device 105. The bezel is between the edge of the display 135 and the edge 140 of the tablet computing device 105. The home key 115 may also be an icon on the display of the tablet computing device 105.

The system may include a second a home key 230 on the docking station 110. When the tablet 105 is docked to the docking station 110 the second home key 120 can provide the same function the home key 115 provides when the tablet 105 is not docked to the docking station 110.

When the home key 115 is disabled the tablet computing device 105 may indicate to the user that the home key is disabled. For example the tablet computing device may include a deactivation indicator 240 on the display of the tablet computing device. The icon could be for example an x or a slash through an image of the home key. If the home key is backlit then the tablet computing device may turn off the backlight when the home key 115 is disabled as the deactivation indicator 240. The deactivation indicator 240 may also be another indicator such as an audible feedback such as an error associated sound or haptic feedback when the home key 115 is actuated but disabled.

The tablet computing device 105 may include an activation sensor in the release 120. The activation sensor may be used to disable the home key 115 when the release is being activated to uncouple the tablet 105 from the docking station 110 but allow the home key to be active at other times.

The controller 125 can include a home key disable component 130. The home key disable component may be logic embodied in the controller or executed by the controller.

Figure 3:
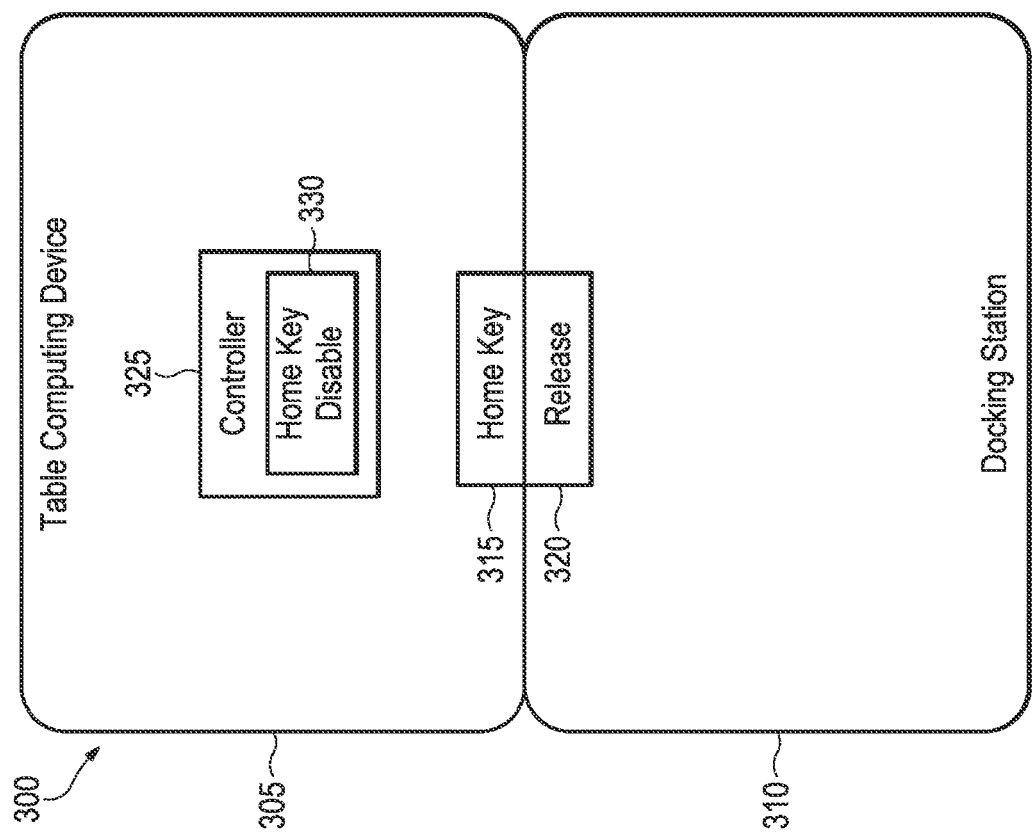
FIG. 3 is a block diagram of tablet computing device and a docking station according to an example implementation.

FIG. 3 is a block diagram of tablet computing device and a docking station according to an example implementation. A computing system 300 can include a tablet computing device 305 and a docking station 310 to couple to the tablet computing device 305. The tablet computing device may include a home key 315. The docking station 310 may include a release 320 to separate the tablet computing device 305 from the docking station 320.

A controller 325 in the tablet computing device 305 can disable the home key 315 if the tablet computing device 305 is connected to the docking station. The controller 325 may disable the home key 315 if the release 320 is activated but allow the home key 315 to be enabled at other times. A home key disable component 330 may be executed by the controller 325.

Figure 4:
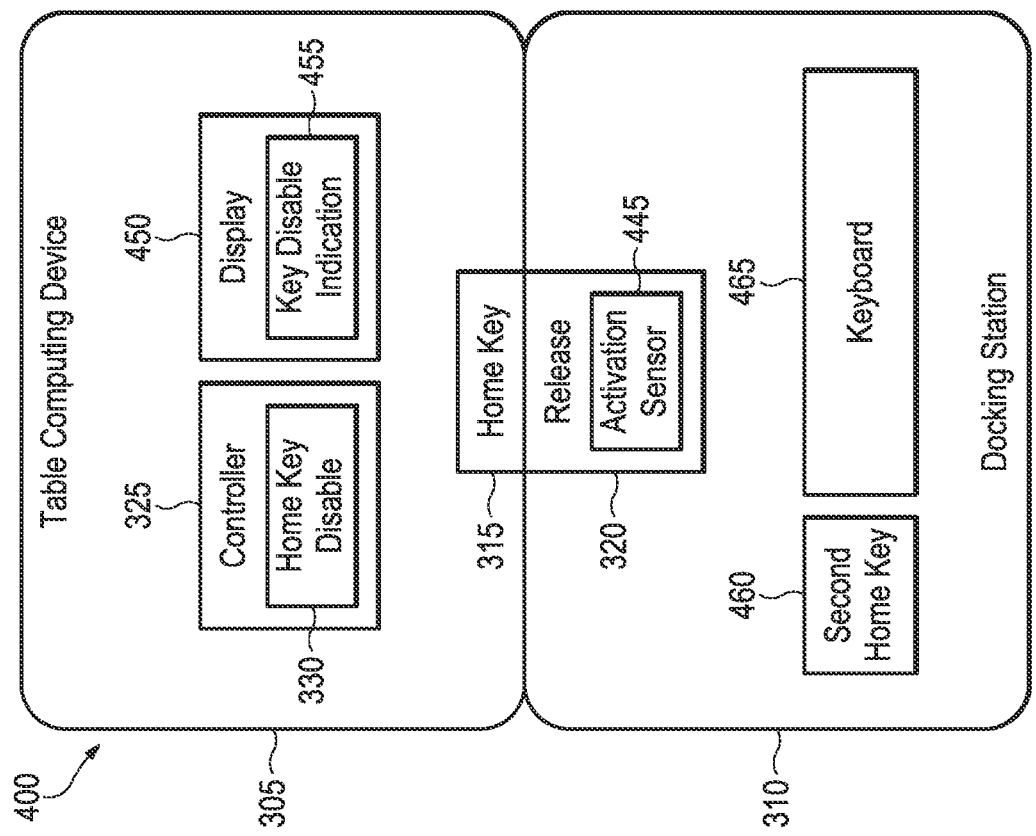
FIG. 4 is a block diagram of tablet computing device and a docking station according to an example implementation.

FIG. 4 is a block diagram of tablet computing device 305 and a docking station 310 according to an example implementation. The computing system 400 may include a second home key 460 on the docking station 310. When the tablet 305 is docked to the docking station 310 the second home key 460 can provide the same function the home key 315 provides when the tablet 105 is not docked to the docking station 110.

The tablet computing device 305 can indicate to the user that the home key is disabled with a key disable indication 455. The key disable indication 455 may be an icon on the display 450. The icon could be for example an x or a slash through an image of the home key. If the home key is backlit then the tablet computing device may turn off the backlight when the home key 115 is disabled as the deactivation indicator 455. The deactivation indicator 455 may also be another indicator such as an audible feedback such as an error associated sound or haptic feedback when the home key 115 is activated but disabled.

The home key 315 may be an icon on the display, a switch in the bezel or another button or switch. When the home key 315 is an icon on the display if the icon could be activated when the release is activated the home key 315 at a location in the proximity of the release may be disabled and another home key may be shown on the display, for example at the top of the display or at a side of the display. The icon may change from an aligned state to another location on along the bottom of the display where the Home key is not aligned with the release.

The release 320 may include an activation sensor 445. The activation sensor may be a capacitive sensor that determines a change in capacitance of the release and causes the controller 325 to activate the home key disable component 330.

The release 320 and the home key 315 can be within an accidental activation distance. The accidental activation distance may be a threshold distance of for example 3 centimeters. A user's finger may be able to activate the home key 315 if the home key 315 is less than 3 centimeters from the release. The release 320 and the home key 315 can be adjacent. Adjacent can mean that the release 320 and the home key 315 are next to each other.

The release 320 on the docking station 310 and the home key 315 on the tablet computing device 305 can be at an angle of 90 degrees or less to each other. For example the bezel or display that includes the home key 315 may be at a 90 degree angle or less to the surface of the docking station that includes the release 320. When the home key 315 is on a surface that is at an acute angle to the release it may be more likely that the home key is activated unintentionally when activating the release.

The docking station 310 may include a keyboard 465. The keyboard may be a "qwerty" keyboard or another type of keyboard. The docking station 310 may include additional ports, storage, battery or another component usable by the tablet computing device 305 when docked to the docking station 310. For example the docking station 310 may include a Universal serial bus (USB) port, an HDMI port, or another type of port. The docking station 310 may include a hard drive to provide additional storage to the tablet computing device 305. The docking station may also include other components or features such as a card reader for reading ID card or another type of card reader.

Figure 5:
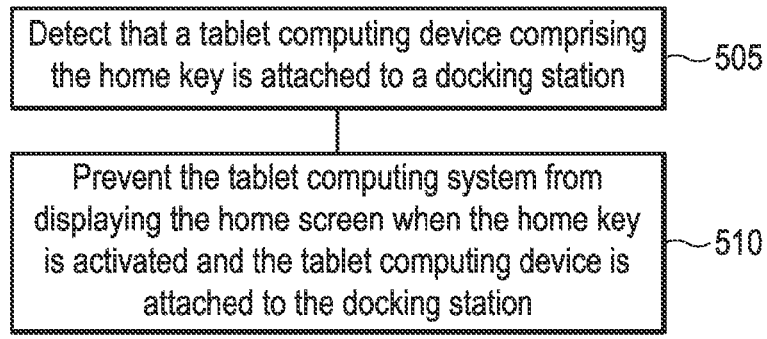
FIG. 5 is a flow diagram of a method of disabling a home key according to an example implementation.

FIG. 5 is a flow diagram of a method of disabling a home key according to an example implementation. The method of disabling a home key includes detecting that a tablet computing device including a home key is attached to a docking station at 505. The tablet computing system can be prevented from displaying the home screen when the home key is activated and the tablet computing device is attached to the docking station at 510.

Figure 6:
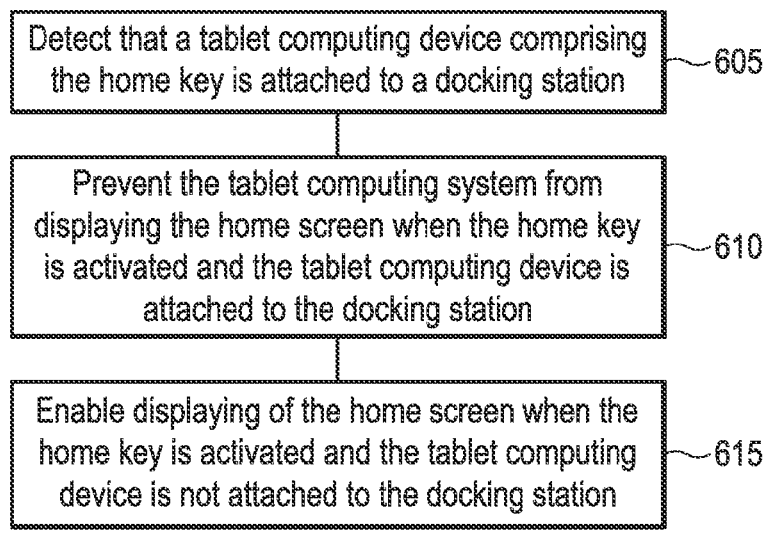
FIG. 6 is a flow diagram of a method of disabling a home key according to an example implementation.

FIG. 6 is a flow diagram of a method of disabling a home key according to an example implementation. The method of disabling a home key includes detecting that a tablet computing device comprising the home key is attached to a docking station at 605. The tablet computing system can be prevented from displaying the home screen when the home key is activated and the tablet computing device is attached to the docking station at 610. Preventing displaying the home screen when the home key is activated may include at least one of intercepting the interrupt generated by the home key, redirecting the interrupt generated by the home key, and ignoring the interrupt generated by the home key. Intercepting the interrupt may prevent the interrupt signal from getting to its destination. Redirecting the interrupt may include changing the destination of the interrupt signal. Ignoring the interrupt may include the interrupt signal reaching the destination but not causing the home screen to be displayed.

The method can include enabling the displaying of the home screen when the home key is activated and the tablet computing device is not attached to the docking station at 615.

Figure 7:
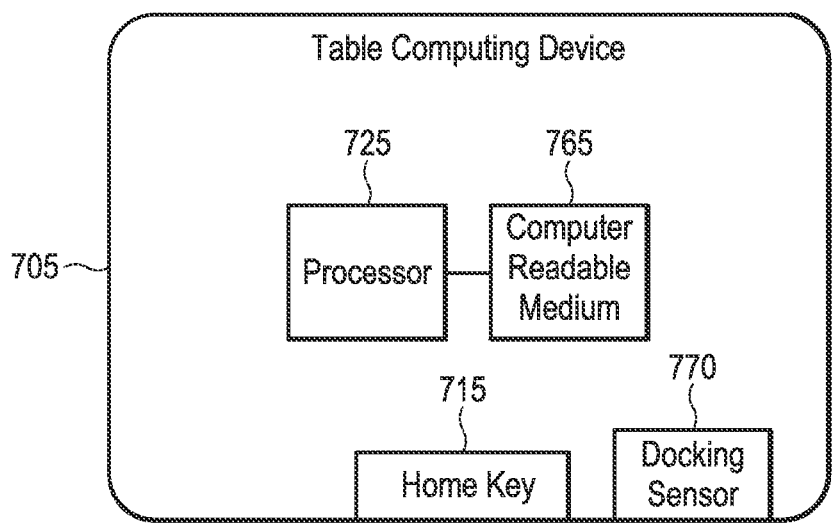
FIG. 7 is a tablet computing device including a computer readable medium according to an example implementation.

FIG. 7 is a tablet computing device including a computer readable medium according to an example implementation. The tablet computing device 705 can include a non-transitory computer readable medium 765. The non-transitory computer readable medium can include code that if executed by the processor 725 can cause the processor to disable a home key 715. To disable the home key 715 the processor can detect that a tablet computing device 705 is attached to a docking station with a docking sensor 770. If the tablet is attached to the docking station the tablet computing device 705 can be prevented from displaying the home screen when the home key is activated.

The techniques described above may be embodied in a computer-readable medium for configuring a computing system to execute the method. The computer readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A device comprising:
   a tablet computing device;
   a docking station to couple to the tablet computing device;
   a home key displayed as an icon on a display of the tablet computing device;
   a release, in the docking station, to separate the tablet computing device from the docking station; and
   a controller in the tablet computing device to disable the home key when the tablet computing device is connected to the docking station, wherein an activation of the home key generates an interrupt signal that is ignored.

2. The device of claim 1, wherein the home key is a capacitance switch.

3. The device of claim 1, further comprising a second home key on the docking station.

4. The device of claim 1, wherein the tablet computing device indicates to a user that the home key is disabled.

5. The device of claim 1, wherein the release comprises an activation sensor.

6. The device of claim 1, wherein the release and the home key are within a threshold distance.

7. A device comprising:
   a tablet computing device;
   a docking station to couple to the tablet computing device;
   a home key displayed as an icon on a display of the tablet computing device;
   a release, in the docking station, to separate the tablet computing device from the docking station; and
   a controller in the tablet computing device to disable the home key when the tablet computing device is connected to the docking station and the release is activated, wherein an activation of the home key generates an interrupt signal that is ignored.

8. The device of claim 7, further comprising a second home key on the docking station.

9. The device of claim 7, wherein the tablet computing device indicates to a user that the home key is disabled.

10. The device of claim 7, wherein the release comprises an activation sensor.

11. The device of claim 10, wherein the activation sensor is a second capacitive switch.

12. The device of claim 7, wherein the release and the home key are within an accidental activation distance.

13. The device of claim 7, wherein the release and the home key are adjacent.

14. The device of claim 7, wherein the release on the docking station and the home key on the tablet computing device are at an angle of 90 degrees or less.

15. The device of claim 7, further comprising a keyboard in the docking station.

16. A method of disabling a home key comprising:
   detecting that a tablet computing device is attached to a docking station, wherein the tablet computing device displays the home key as an icon on a display of the tablet computing device while attached to the docking station; and
   ignoring an interrupt signal generated by an activation of the home key that is displayed and the tablet computing device is attached to the docking station to prevent the tablet computing device from displaying a home screen.

* * * * *